United States Patent [19]
Li et al.

[11] Patent Number: 5,420,947
[45] Date of Patent: May 30, 1995

[54] METHOD FOR ACHROMATICALLY COUPLING A BEAM OF LIGHT INTO A WAVEGUIDE

[75] Inventors: Lifeng Li, Tucson, Ariz.; John C. Brazas, Jr., Hilton, N.Y.

[73] Assignees: Eastman Kodak Company, Rochester, N.Y.; University of Arizona, Tucson, Ariz.

[21] Appl. No.: 261,616

[22] Filed: Jun. 17, 1994

[51] Int. Cl.$^6$ ............................................. G02B 6/34
[52] U.S. Cl. ..................................... 385/37; 359/569; 385/36; 385/129
[58] Field of Search ................. 359/566, 569; 385/10, 385/15, 31, 36, 37, 39, 129

[56] References Cited

U.S. PATENT DOCUMENTS

| | | | |
|---|---|---|---|
| 5,010,458 | 4/1991 | Fraizer et al. | 362/80 |
| 5,044,718 | 9/1991 | Kando | 385/37 X |
| 5,101,458 | 3/1992 | Spaulding et al. | 385/36 |

OTHER PUBLICATIONS

Hetherington et al, Dispersion Compensation for an Integrated Optic Grating Coupler Utilizing a Transmission Volume Hologram, App. Opt. 32, 303–308, 1993 (Jan.).

Gupta et al, Achromatic Compensation for Integrated Optic Grating Couplers With Focused Beams, Appl. Opt. 30, 1461–1463, 1991(Apr.).

Jannson et al, Broad-Band Single-mode Coupler, Proc. OSA Annual Meeting, San Jose Nov. 4, 1991, Paper MY5.

Kando et al, An Integrated Optical Pick-up With Small Wavelength Abberations, Int. Symposium on Optical Memory, IC–5, Sapporo, 1992, 2 pp.

*Primary Examiner*—John D. Lee
*Attorney, Agent, or Firm*—Raymond L. Owens

[57] ABSTRACT

A device for achromatic input coupling of an optical beam into a waveguide is disclosed. The device includes a waveguide formed of a material having an effective index of refraction and having first and second surfaces, such waveguide defining a guided mode of propagation. A first grating is provided at the interface at the first surface of the waveguide, such first grating being selected so as to diffract an optical beam at an appropriate angle selected so that the beam is coupled into the guided mode of the waveguide. A second waveguide is provided at the interface at the second surface of the waveguide, such second grating selected so as to diffract a beam to provide an appropriate angle of incidence onto the first grating at the first surface waveguide. An important aspect of the present invention is the use of linear dispersion of the gratings to cancel the linear portion of the sum of the intrinsic waveguide dispersion and the material dispersions of the waveguide and the prism.

8 Claims, 6 Drawing Sheets

METHOD FOR ACHROMATICALLY COUPLING A BEAM OF LIGHT INTO A WAVEGUIDE

TECHNICAL FIELD OF THE INVENTION

This invention relates to the field of integrated optics and more particularly to a method for input coupling a range of optical wavelengths into a waveguide.

BACKGROUND OF THE INVENTION

Slab waveguide elements introduced into conventional optical systems can provide unique methods of processing optical beams, reduce the system size and weight, and eliminate the alignment difficulties usually associated with conventional optical components. The most practical light source for commercial applications, that could include waveguide systems, is a laser diode (e.g., optical recording and printing). Since the standard input coupling grating would require the laser emission to remain within a range less than 1 nm, waveguide elements may not be considered in these types of applications. The operating range of readily available lasers can be as great as 20 nm because of the relatively broad emission spectrum and resulting wavelength fluctuations that occur from normal operating conditions (i.e. variations in the ambient temperature, selection of the emitted power, laser aging, etc.). An even greater range of input coupling (40 nm to 80 nm) is of interest for chemical and biochemical spectroscopic characterization. A major issue for including integrated optics in these types of applications is the sensitivity of the coupling process to a shift in wavelength and the ease of implementing a solution.

The range of input coupling has been successfully extended by adding refracting and diffracting surfaces before the waveguide grating or simply increasing the angular content of the incident beam. Spaulding and Morris in U.S. Pat. No. 5,010,458 added a prism to the surface of the waveguide grating, with a second grating on the upper surface of the prism, and demonstrated a full-width half-maximum (FWHM) input coupling efficiency of 12 nm. More recently, D. L. Hetherington, R. K. Kostuk, and M. C. Gupta, "Dispersion Compensation for an Integrated Optic Grating Coupler Utilizing a Transmission Volume Hologram", App. Opt., 32, 303–308 (1993) introduced the light through a tilted plate with a volume hologram to achieve a 5 nm FWHM input coupling efficiency. M.C. Gupta and L. Li, "Achromatic Compensation for Integrated Optic Grating Couplers with Focused Beams", Appl. Opt., 30, 1461–1463 (1991) recognized the angular sensitivity of the coupling process to the wavelength of light and extended the input coupling range to about 6 nm but lost input coupling efficiency.

An example of the utility of these concepts for use in an optical recording pick up device is presented in the disclosure by Jannson, Wang, Sun, and Strzelecki, "Broad-band Single-mode Coupler", Proc. OSA Annual Meeting, San Jose (1991). A second example, again pertaining to optical recording was disclosed by Kando et al, in "An Integrated Optical Pickup with Small Wavelength Aberrations", International Symposium on Optical Memory, IC-5, Sapporo (1991).

SUMMARY OF THE INVENTION

It is an object of this invention to extend the range of wavelength input coupled into a waveguide beyond that presently known.

The above object is achieved by a method for achromatically coupling of an input optical beam into a waveguide comprising the steps of:

a) providing a waveguide formed of a material having an effective index of refraction and having first and second surfaces, such waveguide defining a guided mode of propagation;

b) diffracting by a first grating having a period $\Lambda_A$ provided at the interface at the first surface of the waveguide, an optical beam at an appropriate angle selected so that the beam is coupled into the guided mode of the waveguide;

c) diffracting the beam by a second grating $\Lambda_B$ provided at the interface at the second surface of the waveguide to provide an appropriate angle of incidence onto the first grating at the first surface waveguide; and d) adjusting the thickness of the waveguide and the refractive indices of the waveguide system so that an optical beam having an angle of incidence relative to the first grating causes the first grating to provide an angle of diffraction of such incident optical beam so that the angle of incidence on the second grating will diffract the beam at a proper angle to couple light into the guided mode of the waveguide in accordance with $$N_f = N_p + m_A \frac{\lambda}{\Lambda_A} + m_B \frac{\lambda}{\Lambda_B} \qquad (3)$$

where $\lambda$ is the wavelength of light and $m_A$ and $m_B$ are the diffracted orders of the first and second gratings, $N_p$ is the propagation of light within the prism and $N_f$ is selected to be substantially equal to the effective refractive index $N_{wg}$ of the mode of propagation within the waveguide. An important aspect of the present invention is the use of linear dispersion of the gratings to cancel the linear portion of the sum of the intrinsic waveguide dispersion and the material dispersions of the waveguide and the prism.

The present invention makes use of refraction and diffraction of light to input couple light into a waveguide over a broad range of light using the combination of a prism and two gratings. The gratings are preferably on parallel surfaces but not in direct contact, rather they are separated by a distance (i.e., the thickness of the substrate which supports the waveguide and provide the surface on which the gratings are formed).

According to another aspect of the present invention, the index of the prism is selected to be higher than that of the substrate. Thus, if the angle of incidence onto a prism (from normal) is at a high enough angle, the incident beam will reflect and remain in the prism with the exception of the fraction of the beam which is split by the grating diffraction at this surface. Therefore, the design of this grating (blaze, groove depth, and/or the addition of optical coatings on the grating surface) can be used to control the amount of splitting.

Another aspect of the invention is the selection of the propagation characteristics and dispersive properties of the prism and the guided mode of the waveguide and the periods of the gratings. An important feature of this invention is that with proper selection of these values, the wavelength range of the input coupling can be extended.

The final assembly can easily be adapted to applications utilizing conventional optics and waveguides. Models were constructed and experimental results for a device were in excellent agreement and produced uniform input coupling efficiency over the largest range of wavelength reported to date. Relative efficiency of input coupling greater than 0.9 was achieved over a 33 nm range and for greater than 0.5 efficiency the range was 45 nm.

DETAILED DESCRIPTION OF THE PREFERRED EMBODIMENTS

The present invention uses conventional optical elements placed before a waveguide-grating to extend the range of wavelength that light will be efficiently input coupled. The input coupling efficiency of a device which practices this invention is dependent on the wavelength of the incident beam based on the dispersion of the refractive indices of the device and dispersion of the waveguide. These dispersions produce a dependence of the input coupling angle on the wavelength of light.

Figure 1:
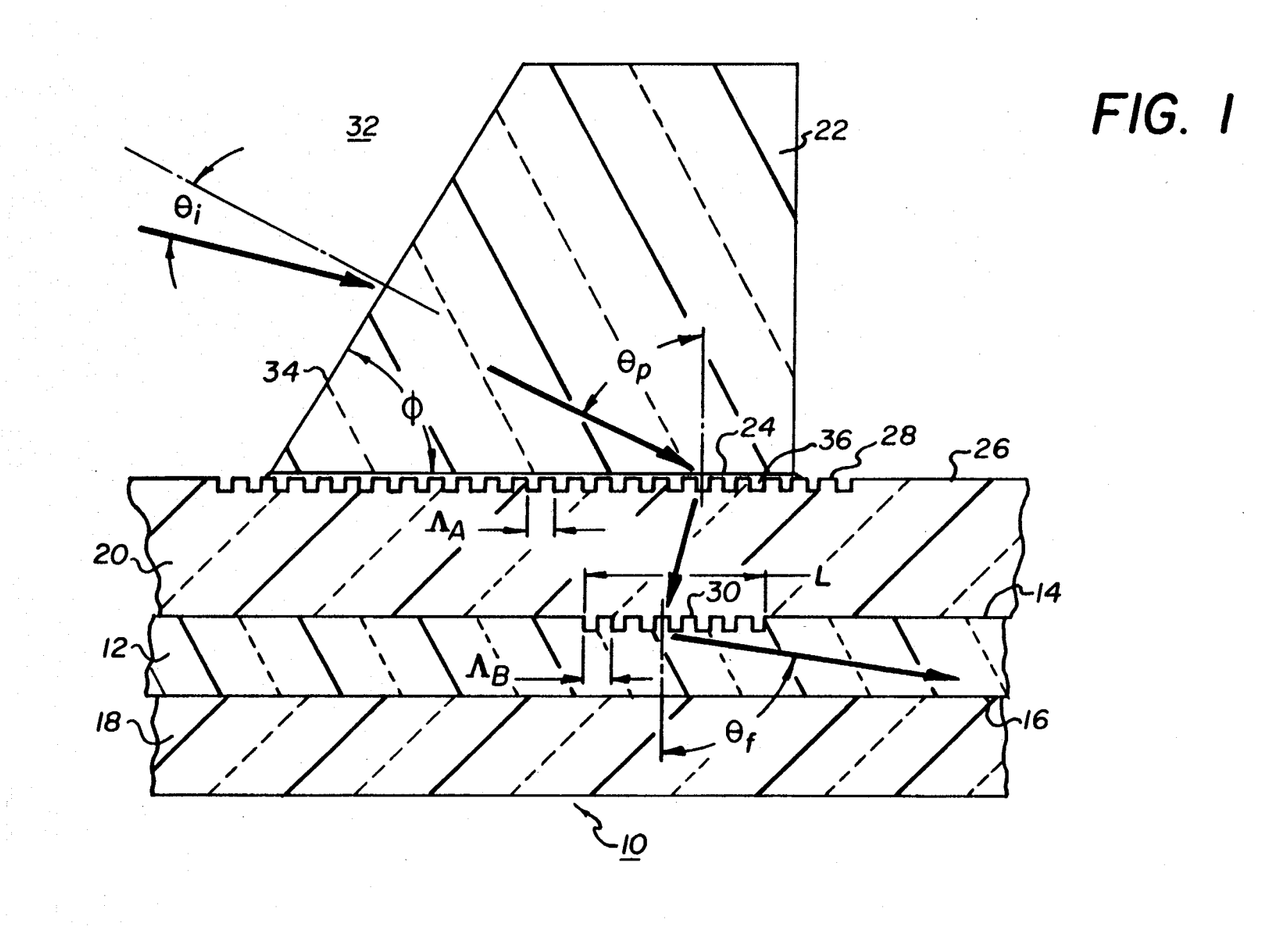
FIG. 1 schematically depicts in cross section a device which practices the invention to extend the range of wavelength of the input coupling.

Turning now to FIG. 1 where a schematic of such a device is shown. The device 10 includes a waveguide 12 having first and second surfaces 14 and 16, respectively. The waveguide has an effective index of refraction $N_{wg}$ and has a dispersion determined by the thickness of the waveguide and the particular material selected for the adjacent cladding 18 and substrate 20. For a particular waveguide with an optical beam having a selected wavelength $\lambda_c$, there will be an effective refractive index and associated dependence of wavelength (i.e., dispersion).

The cladding 18 has a index of refraction $n_c$ which is lower than that of the waveguide and selected to help insure reflection at surface 16. The cladding 18 can be selected from a number of different materials. It is shown as glass but it also can be air or optical coatings. The substrate 20 in similar fashion has an index of refraction $n_s$ that is lower than that of the waveguide 12 and provides basic mechanic support for the waveguide 12. A prism 22 performs the following function. An incidence optical beam at an angle of $\theta_i$ is refracted so that it makes an incident angle $\theta_p$ relative to the perpendicular with respect to a prism surface 24 of the prism 22 which is parallel to the top substrate surface 26 of the substrate 20. It is noted that there are two parallel gratings 28 and 30. Grating 28 is on the top surface of the substrate and grating 30 is on the bottom surface of the substrate. These gratings can be provided by creating a surface relief or corrugation on the top and bottom surfaces of the substrate 20. Alternatively, they could be provided on the prism surface 24 of the prism 22 and on the waveguide surface 16 itself and substrate 20 need not be included in the device. They are shown in schematic form and it will be understood that they could be provided by rulings or lithographic or holographic exposure of photoresist material followed by subsequent processing using conventional techniques. As will be understood to those skilled in the art, the substrate itself can be formed of a number of elements and additional gratings can be provided on selected surfaces of such elements so that there is more than two gratings.

The device 10 achromatizes the input coupling process and includes the prism 22. The prism 22 can be of standard design and has a base angle $\phi$ between prism surfaces 24 and 34. The grating 28 has a period $\Lambda_A$ and makes contact to the prism 22 using adhesive or fluid 36 between the grating 28 and prism 22 with an index appropriate for the device. The coupling grating 30 has a period $\Lambda_B$.

The angle of incidence $\theta_i$ on the prism 22 produces an internal incident angle $\theta_p$ of the beam onto prism surface 24. This can be described by Eq. 1.

$$\theta_p = \sin^{-1}\left[\frac{n_i \sin \theta_i}{n_p}\right] + \phi \tag{1}$$

wherein $n_i$ is the refractive index of the incident media 32 which typically can be air. In some applications, however, the incident media 32 can be optical glasses or other material.

The propagation of light within each medium is described by N, $$N = n \sin(\theta) \tag{2}$$

with n being the refractive index and $\theta$ the angle of propagation (N is commonly used to describe an effective refractive index of waveguides). In the design of devices, the values of $\theta_p$ and $\phi$ should nearly be the same requiring only a small angle for $\theta_i$, negating the effect of wavelength dispersion at this first prism surface 34 to allow use of the device with any incident media 32.

The delivery of light into the waveguide 12 from the prism 22 occurs according to the equation $$N_f = N_p + m_A \frac{\lambda}{\Lambda_A} + m_B \frac{\lambda}{\Lambda_B} \tag{3}$$

where $\lambda$ is the wavelength of light and m is the diffracted orders of the gratings. To achieve efficient input coupling, the value of $N_f$ must match the effective refractive index $N_{wg}$ of the mode of propagation within the waveguide 12. A value for the relative efficiency of input coupling can be obtained by using the difference between these values $\Delta N$ in the expression.

$$\eta = \text{sinc}^2\left(\frac{\pi L \Delta N}{\lambda}\right) \quad (4)$$

where L is the length of the grating 30 perpendicular to the grating grooves. For this expression to apply, the incident beam has a waist much greater than L and the inverse of the coupling rate of the grating 30 $1/\alpha$ (i.e., coupling length) is also much greater than L.

Achromatization of the input coupling process required a balancing of the effects of the media and associated surfaces to minimize the $\Delta N$ across the wavelength range of interest, and simultaneously meet the coupling condition $\Delta N=0$ at a selected center wavelength $\lambda_c$. The way for achieving an achromatic design for the system presented in this work, can be understood by considering the wavelength dispersion of the terms of Eq. 3. The media terms (N) have dispersions that take a form not unlike other media while the two grating surface terms (A and B) are linear functions of the wavelengths. In conventional grating input coupling $\Delta N$ is set to zero using only one grating term, but the single grating term increases the $\Delta N$ at all other wavelengths. The introduction of the second grating term has a counter effect on $\Delta N$ resulting from the opposite sign for the diffracted orders $m_A$ and $m_B$. The combination of the grating terms can be used to add a linear offset to the original mismatch for the dispersion of the media terms. By careful selection of the prism 22 material and waveguide 12 design (indices of cladding 18 and substrate 20 and waveguide 12 thickness) these principles can be applied.

In accordance with this invention, the characteristics of the waveguide 12 can be considered fixed and not adjusted to meet the condition of achromatization. This challenge is representative of working with a waveguide already having desired characteristics. However, the pitch of the waveguide grating 30 $\Lambda_B$ was selected to produce a reasonable angle of incidence for input coupling with good efficiency (i.e., $-25°$ within the substrate 20).

Figure 2:
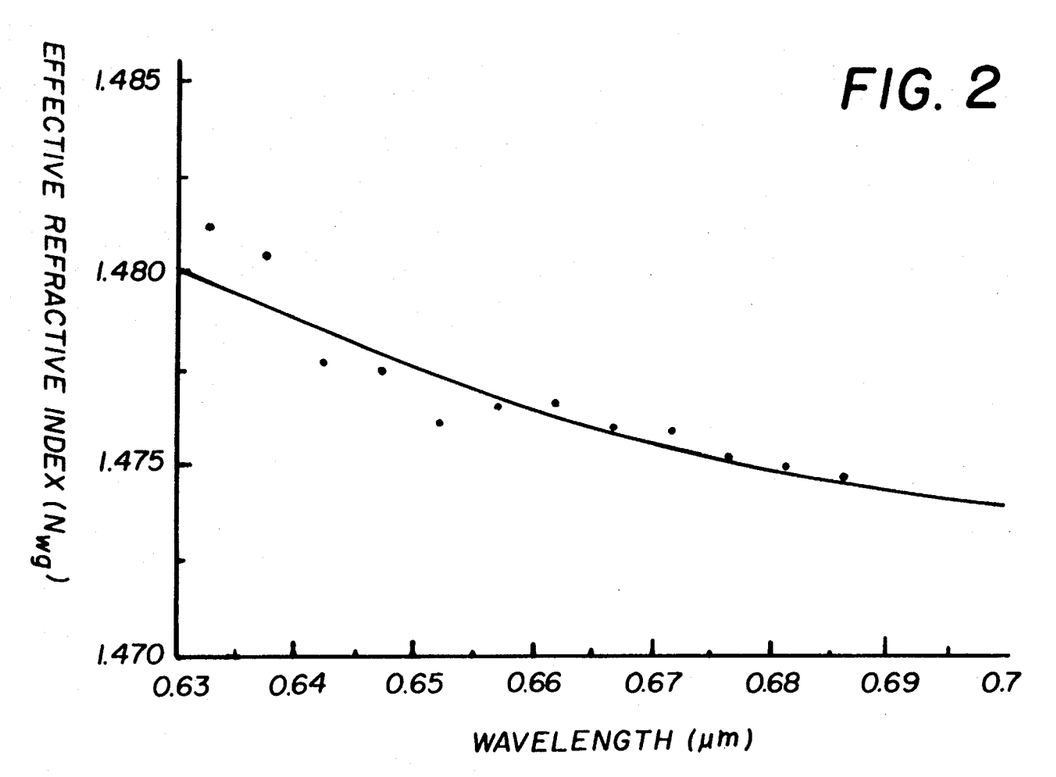
FIG. 2 shows measured values of $N_{wg}$ from the waveguide of the FIG. 1 device and the solid line illustrates the mathematical interpolation of these points for use in the model.

In a device made which practices this invention the waveguide 12 was formed by sputtering glass Corning 7059 to a thickness of about 0.4 μm. The dispersion of a mode of propagation within a waveguide is the results of the dispersion of the guided mode and the associated materials; substrate 20, waveguide 12, and cladding 18. FIG. 2 shows the experimental values for N for such a device determined by accurately measuring the angle of grating input coupling that produced the highest efficiency at each wavelength. The wavelength range used (635 nm to 690 nm) was available using a single dye in a continuously-operated dye laser. Also shown in FIG. 2 is a best fit to the data using the polynomial expression $$N_{wg} = a + b\lambda + c\lambda^2 \quad (5)$$

with values of a=1.8981, b=−1.1791, and c=0.81849. The values of this expression was used in the model as representative of the measured values. The prism 22 had a base angle $\phi$ of 60° and the material selected was glass SF1 produced by Schott.

Both gratings 28 and 30 were relief gratings fabricated by forming a photoresist mask and then ion milling the grating grooves into the substrate. However, these gratings could be the result of other methods to form a diffracting surface. The grating on the top surface 26 of the substrate 20 was continuous across the surface 26. The input coupling gratings 28 and output coupling grating (not shown) were fabricated using positive photoresist image reversal techniques to define the grating length L. These gratings were 1 mm in length and were spaced apart by 10 mm to allow easy isolation of the input and output coupled beams for the experimental analysis.

EXAMPLE 1

Figure 3:
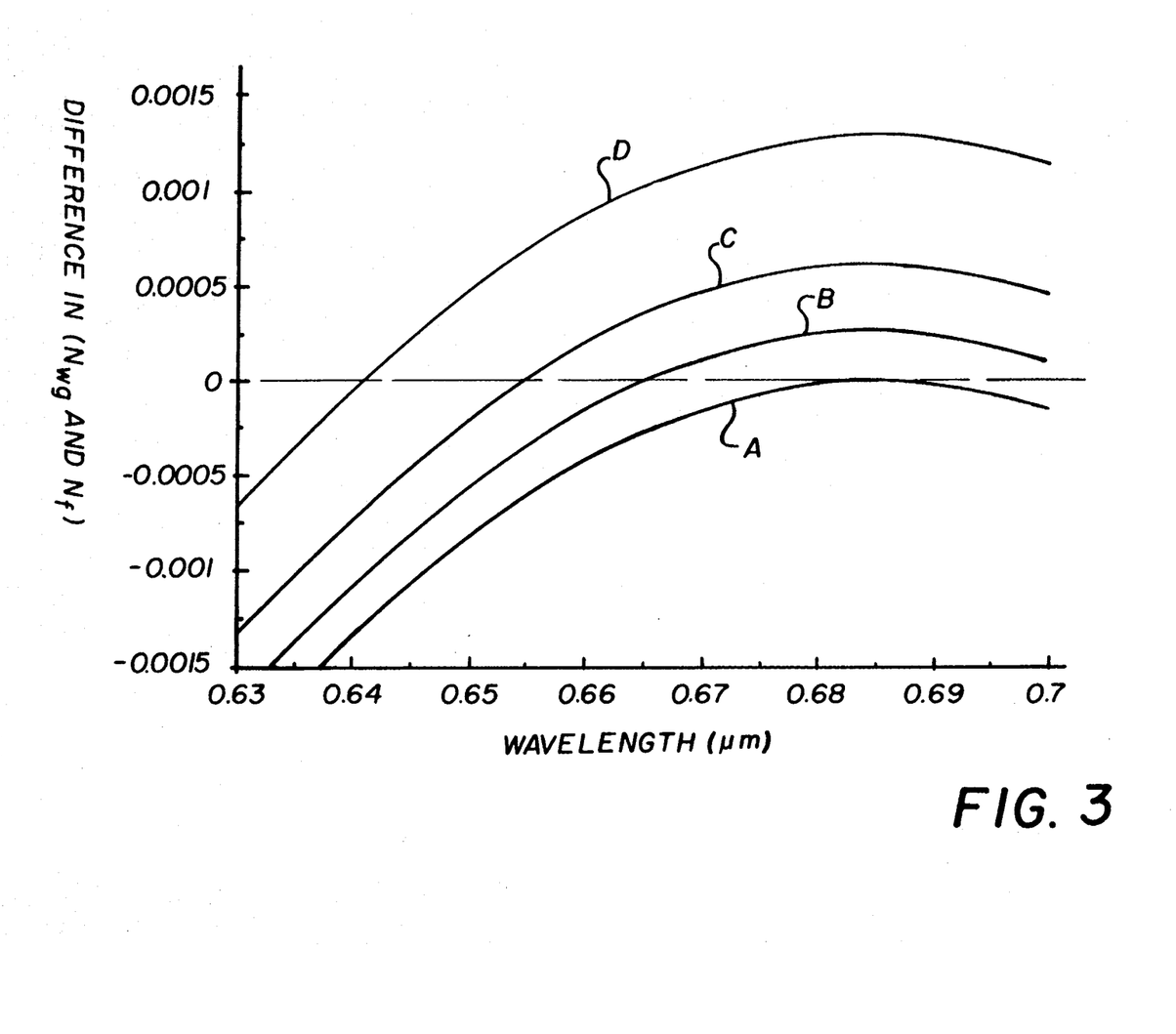
FIG. 3 shows model results for different angles of incidence $\theta_i$ and plots the difference in effective refractive index $N_{wg}$ and a propagation characteristic $N_f$ versus wavelength.

For the first example of achromatization, a center wavelength $\lambda_c$ of 685 nm was selected for use in the optimization of the device. The pitch measured for the waveguide grating 30 $\Lambda_b$ was 0.3088. The optimum value of the pitch of grating 28 $\Lambda_A$ was determined to be 0.3094 μm by simultaneously minimizing the slope of $\Delta N$ and driving $\Delta N$ to zero at $\lambda_c$. The results of this optimization is curve A of FIG. 3. In FIG. 3, the term $\Delta N$ can represent the difference in the effective refractive index $N_{wg}$ and $N_f$ defined in FIG. 3.

Figure 4:
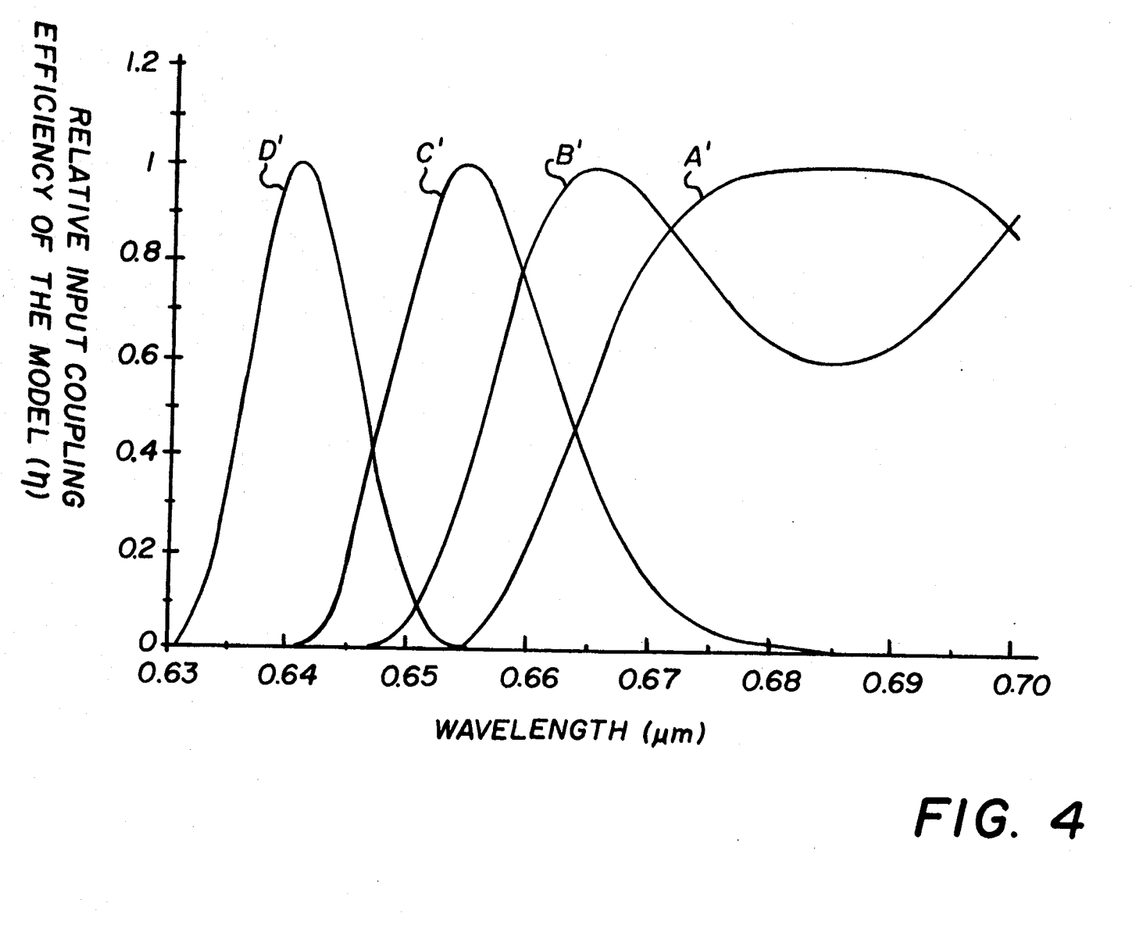
FIG. 4 depicts the model results for the relative efficiency of input coupling $\eta$ versus wavelength of input light.

The family of curves in FIG. 3 illustrates the effect of detuning the angle of incidence $\phi_i$ in the optimized design. With an increased detuning of the incident angle, the slope at the zero intersection increases and shifts to a shorter wavelength. As shown, there are specific wavelengths 0.642 microns, 0.655 microns, 0.665 microns and 0.685 microns where there is no difference in $N_{wg}$ and $N_f$ at zero values for $\Delta N$ identified by cases A, B, C, and D (see also Table 1). The model results for the normalized input coupling efficiency $\eta$ is shown in FIG. 4 with identified cases A', B', C', and D'. As expected the full-width half-maximum (FWHM) of the efficiency curves decreased as seen by examining the slope of the corresponding curves A-D near the intersection of zero in FIG. 3.

Using a grating at surface 26 having a pitch $\Lambda_A$ of 0.3072 μm, a $\lambda_c$ value of about 685 nm was achieved experimentally and the values of $\eta$ were measured. The experimental incident angle $\theta_i$ was 6.65° to obtain a maximum near 685 nm. Experimentally detuning of the incident angle produced the family of curves A'', B'', C'', and D'' shown in FIG. 5.

Figure 5:
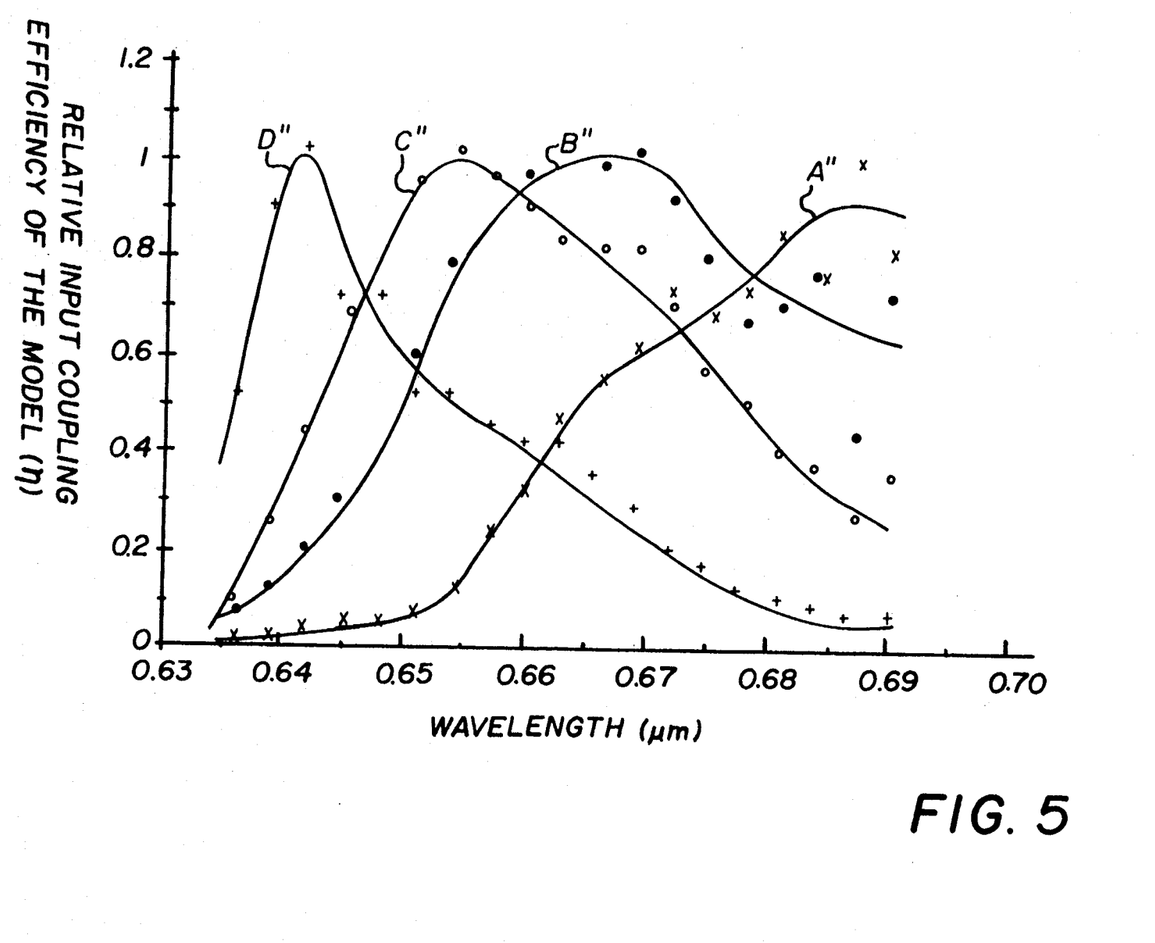
FIG. 5 shows the measured relative efficiency of input coupling versus wavelength for comparison with the model results depicted in FIG. 4.

By comparing FIG. 4 and FIG. 5, the agreement between the model and experimental results is demonstrated indicating the ability to realize a practical system using the appropriate design tools.

Table 1 contains a summary of the model and device experimental results correlated by the letter identifications of the FIGS. There was excellent agreement between the curve shapes and FWHM values of the model and experimental data. These results generally demonstrate the accuracy of the model and measured values and clearly demonstrate the principles of design. The discrepancies between $\theta_i$ values indicate an inaccuracy for the dispersions and grating pitches included in the model. Also, the shift of the peak efficiency across the wavelength range illustrates the ability to tune the device to a desired wavelength by adjusting the incident angle with no physical modification of the device while maintaining a relatively broad wavelength range with high relative efficiency of input coupling. This is a true advantage that will increase the fabrication tolerances for the elements of this device.

TABLE 1

Summary of the model and experimental results for a $\lambda_c$ values of 685 nm and 660 nm.

| Peak Efficiency $\lambda$ nm | Model $\Theta_i$ (deg) | Model FWHM (nm) | Experiment $\Theta_i$ (deg) | Experiment FWHM (nm) |
| --- | --- | --- | --- | --- |
| ($\lambda_c$ = 685 nm) | | | | |
| 685 | −1.062 | 42 (A') | 6.65 | 40 (A") |
| 665 | −1.027 | 26 (B') | 6.8 | 40 (B") |
| 655 | −0.997 | 15 (C') | 6.95 | 30 (C") |
| 645 | −0.922 | 10 (D') | 7.1 | 20 (D") |
| ($\lambda_c$ = 660 nm) | | | | |
| 660 | 1.409 | 42 (E') | 7.0 | 45 (E") |

EXAMPLE 2

Figure 6:
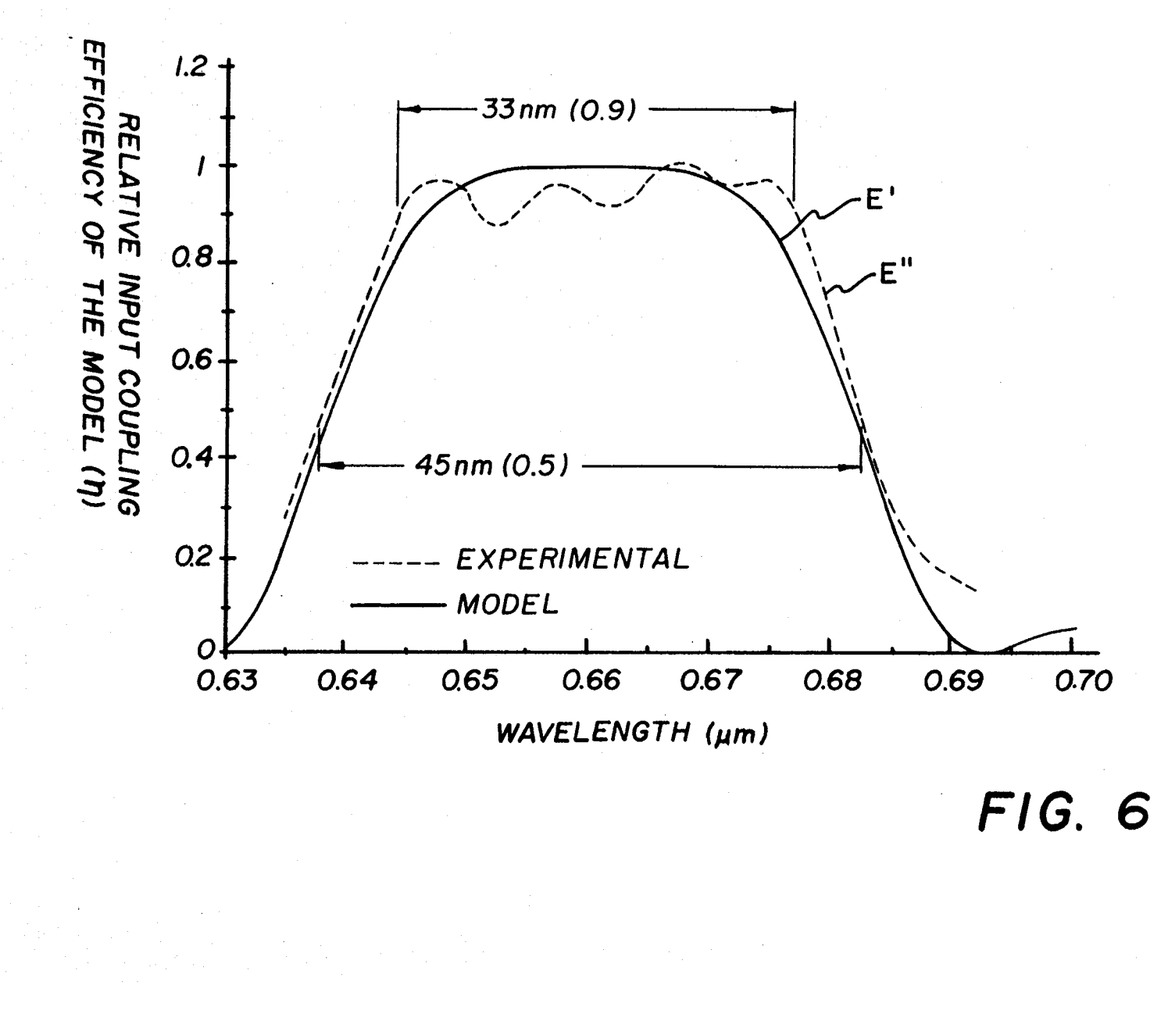
FIG. 6 shows experimental and model results of relative input Coupling efficiency $\eta$ versus wavelength obtained for an optimized device responding to an optical beam having a $\lambda_c$ of 0.660 μm.

In a second example, the maximum range of input coupling was demonstrated for this device by selecting a $\lambda_c$ value of 660 nm near the center of the wavelength range used for measurement. The selection of a new value of $\lambda_c$ required determining new values for $\Lambda_A$ and $\theta_i$. According to the model, the optimum value of $\Lambda_A$ was 0.30637 µm requiring an incident angle $\theta_i$ of 1.409°. The value of $\Lambda_A$ used to center the peak input coupling efficiency was 0.3066 µm and an incident angle of 7.00° was required. FIG. 6 shows the model E' and experimental E" results for the relative input coupling efficiency $\eta$ (see Equation 4) and a comparison of the model and experimental results are included in Table 1. Again, there was excellent agreement between the model and experiment and an extremely flat response for efficiency greater than 0.9 was observed, extending 33 nm. This type of response is advantageous when a range of wavelengths are present during operation, the need to correct any effects on intensity detection for optical beam processing for a changing in wavelength can be eliminated. Specifically, this wide range of uniform efficiency far exceeds the normal operation of laser diodes.

The present invention is particularly suitable for use in optical recording technology. A device in accordance with the present invention can be used in an apparatus that is capable of generating a focus and tracking error signal. An apparatus in which the present invention is particularly suitable for use is set forth in commonly assigned U.S. Ser. No. 004,026 filed Jan. 15, 1993, the disclosure of which is herein incorporated by reference. That device as presented would not be useful when the wavelength of the laser source employed was not stable. By the addition of the prism 22 and grating 30, it would be possible to negate the effects of wavelength shift. In addition, based on values of $\theta_p$ in the examples above (about 60°) the beam incident on grating 30 would have no zero order transmitted beam (i.e., there would normally be total reflection at prism surface 24). Only the 1st order diffracted beam would exit below grating 30 and the remainder would be reflected and collected using a condensing element or directly illuminate a detector for detection of recorded data on an optical disk. The first order diffracted beam would be processed by the waveguide grating as described in the referenced document.

In conclusion, the input coupling for a waveguide grating has been achromatized by the addition of a prism 22 and grating 30. The components make up a solid device that can easily be added to an optical system and its discrete components can be made by standard fabricated techniques. A broad range of wavelengths were input coupled, considerably greater than any results reported to date, and the wavelength of peak efficiency was demonstrated as tunable by changing the incident angle or selecting a new grating pitch.

The invention has been described in detail with particular reference to certain preferred embodiments thereof, but it will be understood that variations and modifications can be effected within the spirit and scope of the invention.

Parts List 10 device
12 waveguide
14 surface
16 surface
18 cladding
20 substrate
22 prism
24 prism surface
26 substrate surface
28 grating
30 grating
32 incident media
34 prism surface
36 adhesive or fluid

We claim:

1. A method for achromatically coupling an input optical beam into a waveguide comprising the steps of:
   a) providing a waveguide formed of a material having an effective index of refraction and having first and second surfaces, such waveguide defining a guided mode of propagation;
   b) diffracting by a first grating having a period $\Lambda_A$ provided at the interface at the first surface of the waveguide and a medium, an optical beam at an appropriate angle selected so that the beam is coupled into the guided mode of the waveguide;
   c) diffracting the beam by a second grating having a period $\Lambda_B$ provided at the interface at the second surface of the waveguide to provide an appropriate angle of incidence onto the first grating at the first surface of the waveguide; and
   d) adjusting the effective refractive indices of the waveguide so that an optical beam having an angle of incidence relative to the first grating causes the first grating to provide an angle of diffraction of such incident optical beam so that the angle of incidence on the second grating will diffract the beam at a proper angle to couple light into the guided mode of the waveguide in accordance with $$N_f = N_p + m_A \frac{\lambda}{\Lambda_A} + m_B \frac{\lambda}{\Lambda_B} \qquad (3)$$

where $\lambda$ is the wavelength of light and $m_A$ and $m_B$ are the diffracted orders of the first and second gratings respectively, $N_p$ is the index of refraction of light within the medium, and $N_f$ is selected to be substantially equal to the effective refractive index $N_{wg}$ of the mode of propagation within the waveguide.

2. The method of claim 1 wherein the first and second gratings are disposed in parallel relation relative to each other.

3. The method as set forth in claim 1 wherein the gratings are surface relief structures.

4. The method as set forth in claim 1 further including optical coatings provided on the gratings to increase diffraction efficiency.

5. The method as set forth in claim 1 further including adjusting the angle of incidence of the optical beam to select the wavelength of highest input coupling efficiency.

6. The method of claim 1 further including selecting the period of the first grating to position the broadest range of input coupling at a desired wavelength.

7. The method according to claim 1 wherein the medium is provided by a prism and further including selecting the index of refraction of the prism to be of higher index of refraction than the waveguide.

8. The method as set forth in claim 1 wherein the waveguide includes a plurality of elements and wherein the first grating is provided on the top surface of the waveguide, the second grating is provided on the bottom surface of the waveguide, and at least one additional grating is provided on a surface of one of the waveguide's elements.

* * * * *